US008182024B2

(12) United States Patent
Hayes et al.

(10) Patent No.: US 8,182,024 B2
(45) Date of Patent: May 22, 2012

(54) STRUCTURE AND A SYSTEM FOR CONNECTING A MACHINE CAB TO A SUPPORTING FRAME

(75) Inventors: Aaron R. Hayes, Emden, IL (US); Christopher D. Derham, East Peoria, IL (US); Lance M. Cowper, Toluca, IL (US); Ralph J. Lee, Morton, IL (US)

(73) Assignee: Caterpillar Inc., Peoria, IL (US)

( * ) Notice: Subject to any disclaimer, the term of this patent is extended or adjusted under 35 U.S.C. 154(b) by 400 days.

(21) Appl. No.: 12/314,125

(22) Filed: Dec. 4, 2008

(65) Prior Publication Data
US 2009/0085377 A1    Apr. 2, 2009

Related U.S. Application Data

(63) Continuation-in-part of application No. 11/443,297, filed on May 31, 2006, now abandoned.

(51) Int. Cl.
*B62D 33/07* (2006.01)
(52) U.S. Cl. ........... 296/190.07; 296/190.05; 180/89.14; 180/89.13
(58) Field of Classification Search ............. 296/190.01, 296/190.04–190.08; 180/89.12–89.15
See application file for complete search history.

(56) References Cited

U.S. PATENT DOCUMENTS

| D131,591 S | 3/1942 | Keller |
| 2,464,696 A | 3/1949 | Lelong |
| 2,502,322 A | 3/1950 | Iredell, Jr. |
| 2,519,702 A | 8/1950 | Robinson |
| 2,683,016 A | 7/1954 | Campbell |
| 3,088,537 A | 5/1963 | Le Tourneau |
| 3,158,395 A | 11/1964 | Smith |
| 3,721,417 A | 3/1973 | Skala et al. |
| 3,802,530 A | 4/1974 | Purcell et al. |
| 3,809,427 A | 5/1974 | Bennett |
| 3,819,225 A | 6/1974 | Carlisle et al. |
| 3,868,190 A | 2/1975 | Moore |
| 3,973,793 A | 8/1976 | Hirst, Jr. et al. |
| 3,990,737 A | 11/1976 | Palmer |
| D242,816 S | 12/1976 | Maurer |
| RE29,123 E | 1/1977 | Malm et al. |
| 4,043,585 A | 8/1977 | Yamanaka |

(Continued)

FOREIGN PATENT DOCUMENTS
DE        200 10 214 U1    1/2001
(Continued)

*Primary Examiner* — Glenn Dayoan
*Assistant Examiner* — Gregory Blankenship
(74) *Attorney, Agent, or Firm* — Finnegan, Henderson, Farabow, Garrett & Dunner LLP

(57) ABSTRACT

A system is disclosed for connecting a cab to a machine supporting frame. A sub-frame is secured to the machine supporting frame and is configured to tilt relative to the machine supporting frame. A plurality of vibration damping mechanisms is configured to at least partially inhibit transmission of shocks and vibrations between the sub-frame and the cab. A plurality of dead stop mechanisms is configured to limit movement between the sub-frame and the cab. A rigid connection between the machine supporting frame and the sub-frame is configured to be selectively disconnected. A pivot connection between the machine supporting frame and the sub-frame is configured to permit the sub-frame and the cab to be tilted relative to the machine supporting frame upon disconnection of the rigid connection.

19 Claims, 9 Drawing Sheets

U.S. PATENT DOCUMENTS

| | | | |
|---|---|---|---|
| 4,061,392 A | | 12/1977 | Lowder et al. |
| 4,061,393 A | | 12/1977 | Blomstrom |
| 4,062,582 A | | 12/1977 | Youmans |
| 4,186,930 A | | 2/1980 | Shulke |
| 4,210,362 A | | 7/1980 | Boersma |
| 4,258,820 A | | 3/1981 | Miura et al. |
| 4,271,921 A | | 6/1981 | Ochsner |
| 4,311,204 A | | 1/1982 | Shupert |
| 4,372,411 A | | 2/1983 | Flower |
| 4,391,436 A | | 7/1983 | Fishbaugh |
| 4,429,759 A | | 2/1984 | Clark |
| 4,452,329 A | * | 6/1984 | Stone et al. ............... 180/89.15 |
| 4,460,168 A | | 7/1984 | Obadal |
| 4,496,188 A | | 1/1985 | Ezell et al. |
| 4,515,234 A | | 5/1985 | Loy et al. |
| 4,720,075 A | | 1/1988 | Peterson et al. |
| 4,783,039 A | | 11/1988 | Peterson et al. |
| 4,806,437 A | | 2/1989 | Yokoi et al. |
| 4,819,980 A | | 4/1989 | Sakata et al. |
| 4,862,983 A | | 9/1989 | Kreft |
| 4,871,150 A | | 10/1989 | Le Salver et al. |
| 5,024,283 A | | 6/1991 | Deli |
| 5,064,242 A | | 11/1991 | Fujan et al. |
| 5,110,081 A | | 5/1992 | Lang, Jr. |
| 5,181,736 A | | 1/1993 | Kokubun |
| 5,368,118 A | * | 11/1994 | Hoefle ....................... 180/89.12 |
| 5,388,884 A | * | 2/1995 | Keehner et al. .......... 296/190.03 |
| 5,413,188 A | | 5/1995 | Ui |
| 5,498,060 A | | 3/1996 | Satomi |
| 5,516,176 A | | 5/1996 | Kimoto et al. |
| 5,520,259 A | | 5/1996 | Onohara et al. |
| 5,551,826 A | | 9/1996 | Todd et al. |
| 5,580,028 A | | 12/1996 | Tomczak et al. |
| 5,590,733 A | * | 1/1997 | Ljungholm et al. ....... 180/89.14 |
| 5,623,410 A | | 4/1997 | Furihata et al. |
| 5,941,920 A | | 8/1999 | Schubert |
| 5,967,597 A | * | 10/1999 | Vander Kooi et al. ... 296/190.07 |
| 5,984,036 A | | 11/1999 | Higuchi et al. |
| 6,017,073 A | * | 1/2000 | Lindblom et al. ........... 296/35.1 |
| 6,029,764 A | | 2/2000 | Schubert |
| 6,073,714 A | * | 6/2000 | McHorse et al. .......... 180/89.14 |
| 6,168,229 B1 | | 1/2001 | Kooi et al. |
| 6,189,954 B1 | | 2/2001 | Martin, Jr. |
| 6,276,749 B1 | | 8/2001 | Okazawa et al. |
| 6,364,043 B1 | | 4/2002 | Lam |
| 6,374,935 B1 | * | 4/2002 | Kirschenmann et al. .. 180/89.12 |
| 6,408,970 B1 | | 6/2002 | Eng |
| 6,474,430 B2 | * | 11/2002 | Hamaekers et al. ........ 180/89.14 |
| 6,478,102 B1 | | 11/2002 | Puterbaugh et al. |
| 6,536,837 B2 | * | 3/2003 | Ishida et al. ............. 296/190.08 |
| 6,619,728 B1 | | 9/2003 | Kummel |
| 6,702,367 B2 | | 3/2004 | Leitner et al. |
| 6,726,272 B1 | | 4/2004 | Puterbaugh et al. |
| 6,986,545 B2 | | 1/2006 | Nilsson et al. |
| 7,140,669 B2 | | 11/2006 | Bollinger et al. |
| 7,287,810 B2 | | 10/2007 | Ishii et al. |
| 7,347,488 B2 | | 3/2008 | Hayes et al. |
| 7,364,223 B2 | | 4/2008 | Mori et al. |
| 2002/0113463 A1 | | 8/2002 | Gross et al. |
| 2002/0121397 A1 | | 9/2002 | Saarinen |
| 2004/0163865 A1 | | 8/2004 | Shimokakiuchi et al. |
| 2007/0278811 A1 | | 12/2007 | Derham et al. |

FOREIGN PATENT DOCUMENTS

| | | |
|---|---|---|
| EP | 0 129 363 A2 | 12/1984 |
| EP | 0 669 484 A1 | 8/1995 |
| GB | 1 557 284 | 12/1979 |
| GB | 2 122 555 A | 1/1984 |
| WO | WO 97/08038 A1 | 3/1997 |

* cited by examiner

STRUCTURE AND A SYSTEM FOR CONNECTING A MACHINE CAB TO A SUPPORTING FRAME

This application is a continuation-in-part of application Ser. No. 11/443,297, filed May 31, 2006, now abandoned the entire contents of which are hereby incorporated by reference.

TECHNICAL FIELD

The present disclosure relates generally to a machine cab and a supporting frame and, more particularly, to structure and a system for connecting a machine cab to a supporting frame.

BACKGROUND

Machines may include a cab, for example to provide a machine operator with protection from the elements and/or a comfortable environment in which to operate the machine. It may be desirable for the cab to not unduly limit access to machine components, so that such machine components may be inspected and/or serviced, for example. To that end, some machine cabs may be configured to be removable from a supporting frame. In addition, some machine cabs may tilt about one or more pivot mountings relative to the supporting frame in order to facilitate inspection and/or servicing.

Some machines, such as wheel loaders, track-type tractors, excavators, etc., may be operated in rugged environment. Such machines may include vibration damping mechanisms tending to inhibit noise and vibrations to which the machine supporting frame may be subjected from being transmitted directly to the machine operator in the cab. Such machines also may include a robust connection between the cab and supporting frame designed to withstand machine roll-over.

One example of a cab supporting structure is described in U.S. Pat. No. 7,364,223 B2 (the '223 patent) issued to Mori et al. on Apr. 29, 2008. The '223 patent describes an attenuation mechanism to protect an operator from high impact forces, vibration, and shock, for example when the machine "falls down," i.e., rolls over. The '223 patent discloses various embodiments of a regulation member intended to improve the rigidity of the cab and prevent cab damage in case of roll-over.

Although the cab supporting structure of the '223 patent may provide some attenuation of vibrations and protection during roll-over, the system disclosed in the '223 patent may not be sufficiently robust to avoid separation of the cab from the frame. In addition, the system of the '223 patent does not permit tilting the cab relative to the frame without disconnecting the attenuation mechanisms by removing (i.e., "breaking") mounting fasteners. The attenuation mechanisms may be factory assembled with specific fastener torques designed for the life of the machine, and it may be difficult to duplicate proper torques in the field.

The disclosed structure and system are directed to improvements in the existing technology.

SUMMARY OF THE INVENTION

In one aspect, the present disclosure includes a system for connecting a cab to a machine supporting frame. The system includes a sub-frame secured to the machine supporting frame and configured to tilt relative to the machine supporting frame. The system also includes a plurality of vibration damping mechanisms configured to at least partially inhibit transmission of shocks and vibrations between the sub-frame and the cab. The system also includes a plurality of dead stop mechanisms configured to limit movement between the sub-frame and the cab. The system also includes a rigid connection between the machine supporting frame and the sub-frame configured to be selectively disconnected. The system also includes a pivot connection between the machine supporting frame and the sub-frame configured to permit the sub-frame and the cab to be tilted relative to the machine supporting frame upon disconnection of the rigid connection.

According to another aspect, the present disclosure includes a system for connecting a cab to a machine supporting frame. The system includes a sub-frame and a vibration damping mechanism coupling the sub-frame and the cab. The system also includes a dead stop mechanism limiting movement between the sub-frame and the cab. The system also includes a flange on the sub-frame and at least one fastener securing the flange to the machine supporting frame. The system also includes a pair of apertures extending through the sub-frame, a frame mount including an elongated bore aligned with the pair of apertures, and a pin extending through the aligned apertures and bore.

DETAILED DESCRIPTION

Figure 1:
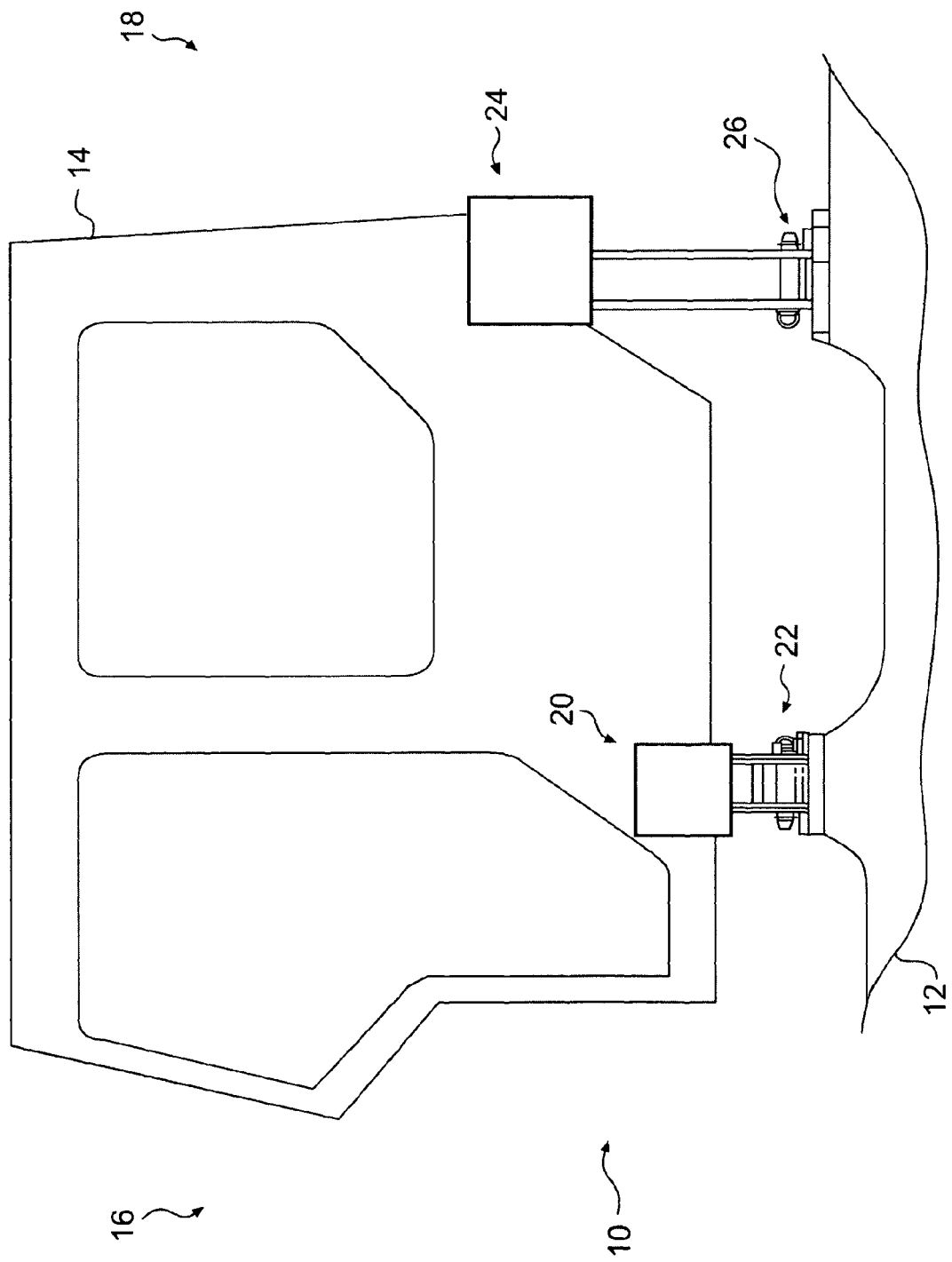
FIG. 1 is a diagrammatic illustration of a portion of a machine incorporating features according to disclosed embodiments.

FIG. 1 is a highly diagrammatic partial illustration of a machine 10. Machine 10 may include a machine supporting frame 12 and a cab 14. The diagrammatic view in FIG. 1, for purposes of convenient illustration and description, is that of the left side of a machine with a front 16 and a rear 18. Machine supporting frame 12 may be a stationary structure, or it may be a mobile structure, including wheels, tracks, etc. For example, machine 10 may be a track-type tractor, a hydraulic excavator, a wheel loader, or another machine known to those having skill in the art. Machine supporting frame 12 may support a power source (not shown), for example a diesel engine, and various machine systems (not shown), such as machine hydraulics, configured to enable and support various machine operations. Cab 14 may include a suitable station for a machine operator, and may house various controls, displays, and interface equipment for the machine operator. In addition, cab 14 may be structured, e.g., by reinforcing, in such a way as to provide roll-over protection for a machine operator, and to mitigate potential damage to the machine in the event of roll-over.

In accordance with disclosed embodiments, cab 14 may be coupled to machine supporting frame 12 via suitable vibration damping mechanisms and associated dead stop mechanisms, and may be connected to machine supporting frame 12 via suitable connecting structures. This structure is only diagrammatically illustrated in FIG. 1 but will be described and illustrated in more detail below and in FIGS. 2-9. Referring to diagrammatic FIG. 1, a portion of cab 14 may be coupled to machine supporting frame 12 via schematically illustrated vibration damping mechanism 20, and may be connected to machine supporting frame 12 via connecting structure 22. A portion of cab 14 may be coupled to machine supporting frame 12 via schematically illustrated vibration damping mechanism 24, and may be connected to machine supporting frame 12 via connecting structure 26. Although FIG. 1 diagrammatically illustrates the vibration damping mechanisms and connecting structures located on the left side of machine 10, it will be understood that similar vibration damping mechanisms and connecting structures may be located on the right side of machine 10. The connecting structures 22, 26, and those associated with an opposite side of the machine, either may be individual connecting structures, or they may be integrated into a suitable sub-frame. The structural details of vibration damping mechanisms 20, 24 (and those located on the opposite side of machine 10) may vary, and may be selected from among numerous vibration damping mechanisms known in the art.

Figure 2:
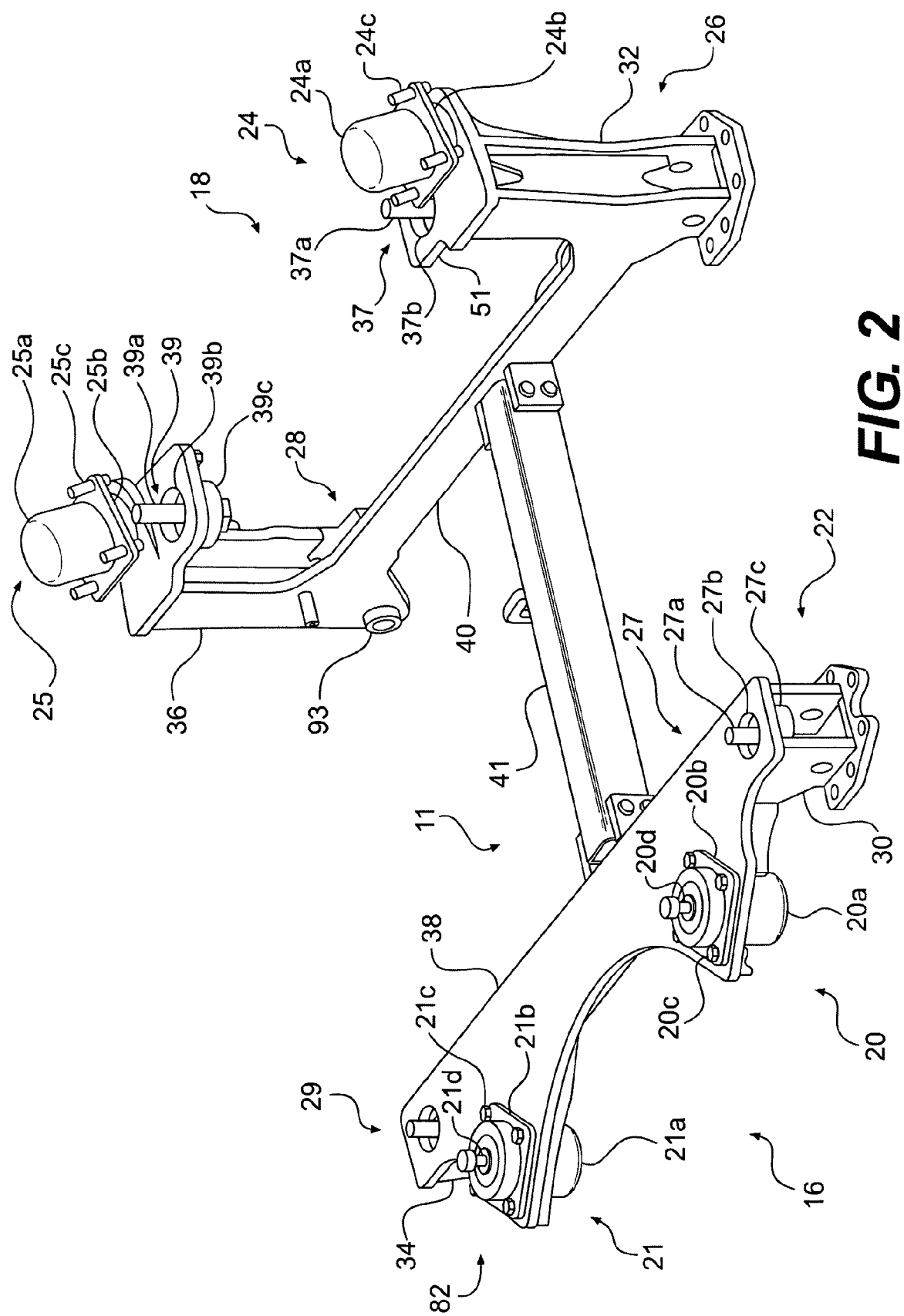
FIG. 2 is a perspective view of a sub-frame that may be employed according to disclosed embodiments.

FIG. 2 is a perspective view illustrating an embodiment that may include a sub-frame 11 integrating connecting structures 22, 26 and similar connecting structures 28 and 82 on the opposite side of machine 10. The sub-frame 11 may include a front frame member 38 and a rear frame member 40 connected by a cross member 41. Front frame member 38 may connect support members 30, 34 associated with connecting structures 22, 82, and rear frame member 40 may connect support members 32, 36 associated with connecting structures 26, 28. The sub-frame 11 may be located generally between a machine supporting frame 12 and a cab 14, but the machine supporting frame 12 and cab 14 are not illustrated in FIG. 2 in order to more clearly show the sub-frame 11 and certain other aspects of the disclosure. The sub-frame 11 may be supported by and mounted on the machine supporting frame 12, and the cab 14 may be mounted on and supported by the sub-frame 11. Thus, the machine supporting frame 12 may be generally below the sub-frame 11, and the cab 14 may be generally above the sub-frame 11.

In the embodiment illustrated in FIG. 2, the sub-frame 11 is configured for a tilt cab arrangement. The left front connecting structure 22 and the left rear connecting structure 26 may be bolted or otherwise fastened to an underlying machine supporting frame 12, while the right front connecting structure 82 and the right rear connecting structure 28 each may include structure permitting pivoting of sub-frame 11 when the left front and left rear connecting structures 22, 26 are unfastened from the machine supporting frame 12. A pivot boss 93 can be seen at right rear connecting structure 28 in FIG. 2.

FIG. 2 also illustrates examples of locations for a plurality of vibration damping mechanisms. There may be, for example, four vibration damping mechanisms 20, 21, 24, and 25. The vibration damping mechanisms may take various forms, but in the example of FIG. 2, they may be somewhat can-shaped, with one located relatively adjacent each of connecting structures 22, 26, 28, and 82. Each of vibration damping mechanisms 20 and 21, located more toward machine front 16, may be bolted via a flange and a plurality of fasteners to front frame member 38. Each of vibration damping mechanisms 24, 25, located more toward machine rear 18, may be bolted via a flange and a plurality of fasteners to cab 14 (not visible in FIG. 2).

Referring to vibration damping mechanism 20 in FIG. 2, for example, the can 20a may be fastened to front frame member 38 of sub-frame 11 toward the left side (as viewed in a direction toward the front 16) of machine 10 via a flange 20b and a plurality of fasteners 20c, e.g., bolts. Central stud 20d may be secured to cab 12. Central stud 20d and can 20a may be configured to move relative to each other in order to accommodate movement of cab 12 (to which central stud 20d is secured) relative to sub-frame 11 (to which can 20a is fastened). Vibration damping mechanism 21 may include components similar to those of vibration damping mechanism 20 (can 21a, flange 21b, fasteners 21c, and central stud 21d) and may be similarly situated relative to front frame member 38 and cab 12 more toward the right side (as viewed in a direction toward the front 16) of machine 10.

Rear vibration damping mechanisms 24 and 25 may be mounted to rear frame member 40 in a fashion similar to the mounting of vibration damping mechanisms 20 and 21 on front frame member 38. However, in the embodiment illustrated in FIG. 2, vibration damping mechanism 24 may include can 24a fastened to cab 12 (not visible in FIG. 2) toward the left side of machine 10 via a flange 24b and a plurality of fasteners 24c, e.g., bolts. A central stud (not shown) of vibration damping mechanism 24 may be secured to rear frame member 40, for example adjacent connecting structure 26. Vibration damping mechanism 25 may include components similar to those of vibration damping mechanism 24 (e.g., can 25a, flange 25b, fasteners 25c, and a central stud, not shown) and may be similarly situated relative to cab 12 and rear frame member 40 more toward the right side of machine 10.

The structural details of vibration damping mechanisms 20, 21, 24, 25 may vary, and may be selected from among numerous vibration damping mechanisms known in the art. For example, the vibration damping mechanisms may include visco-elastic mechanisms, hydraulic mechanisms, spring mechanisms, etc., configured to constrain movement of the central studs (e.g., 20d, 21d, etc.) relative to cans 20a, 21a, 24a, 25a. This may provide a damping effect for any machine vibrations that may be generated in machine supporting frame 12 and sub-frame 11 and substantially isolate the vibrations from cab 14.

Another feature illustrated in FIG. 2 is a dead stop mechanism that may be associated with one or more of the vibration damping mechanisms. For example, in the embodiment illustrated in FIG. 2, dead stop mechanisms 27, 29, 37, and 39 may be associated with vibration damping mechanisms 20, 21, 24, and 25, respectively. Each dead stop mechanism may include similar features and may be similarly structured. Dead stop mechanism 39, for example, may include a stud 39a, e.g., a bolt, that may pass through an enlarged aperture 39b in a portion of associated rear frame member 40 and that may be secured to cab 14. While stud 39a may pass through enlarged aperture 39b with substantial clearance, stud 39a may include an enlarged portion 39c (e.g., an enlarged bolt head and/or a washer larger than aperture 39b) that will not pass through aperture 39b. The distance between the connection of stud 39a to cab 14 and enlarged portion 39c may permit a limited range of movement between sub-frame 11 and cab 14. Accordingly, while vibration damping mechanisms 20, 21, 24, and 25 may permit some movement between cab 14 and sub-frame 11 to accommodate machine vibrations that may otherwise be transmitted to cab 14, dead stop mechanisms 27, 29, 37, and 39 may limit any such movement so as to reduce the chance of damage to vibration damping mechanisms 20, 21, 24, and 25, and so as to reduce the possibility of separation of cab 14 from sub-frame 11 (and thus from machine supporting frame 12) during a roll-over event.

Figure 3:
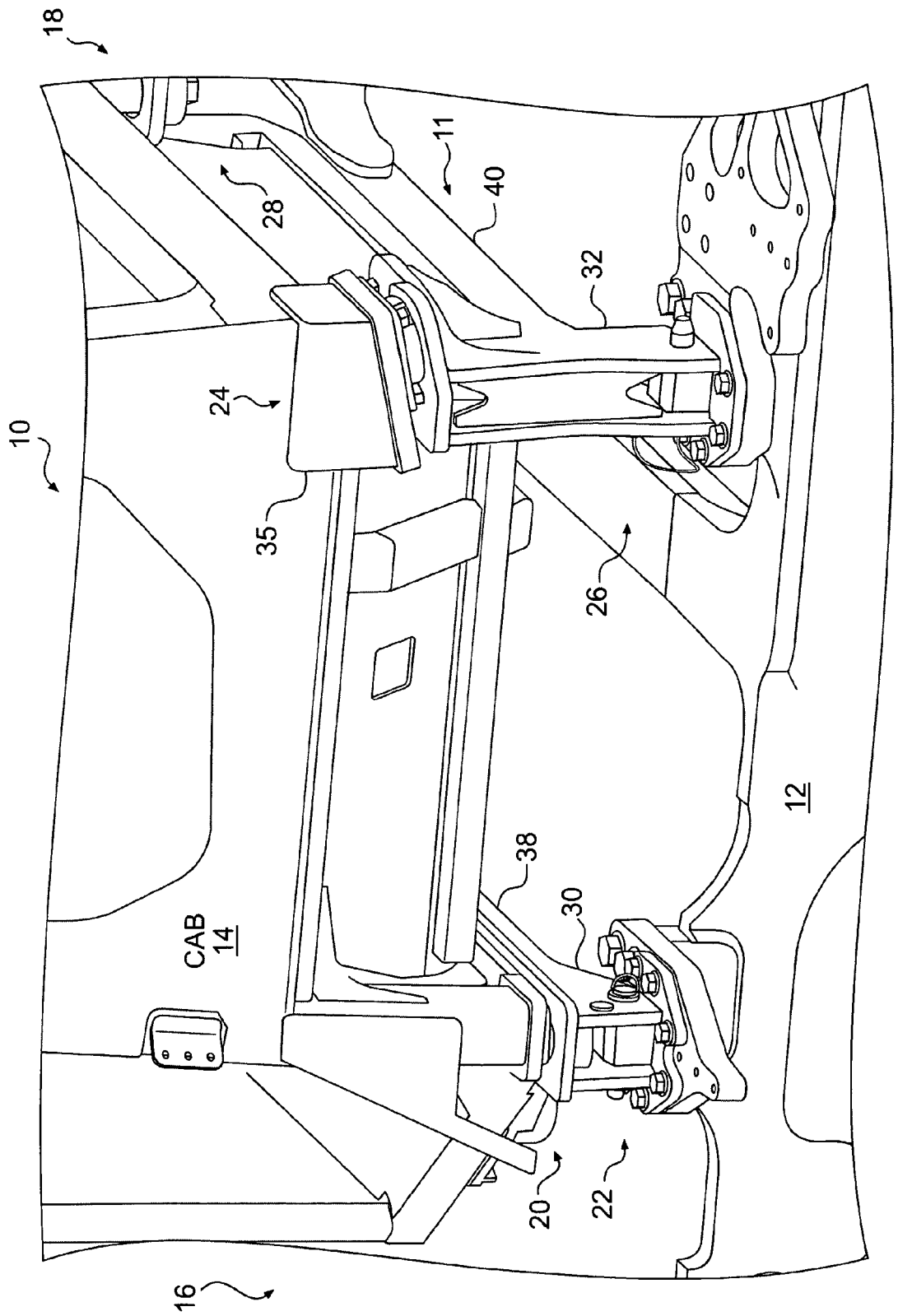
FIG. 3 is a perspective view of a portion of a machine including features according to disclosed embodiments.

FIG. 3 is a perspective view illustrating connecting structures 22, 26 between cab 14 and machine supporting frame 12. Connecting structure 28, on the opposite side of machine 10, also is generally indicated in FIG. 3. Connecting structures 22 and 26 may be associated with support members 30 and 32, respectively, on sub-frame 11. Vibration damping mechanism 24 may be generally associated with rear frame member 40 and adjacent support member 32, for example within housing structure 35. Vibration damping mechanism 20 may be generally associated with front frame member 38 and adjacent support member 30.

Figure 7:
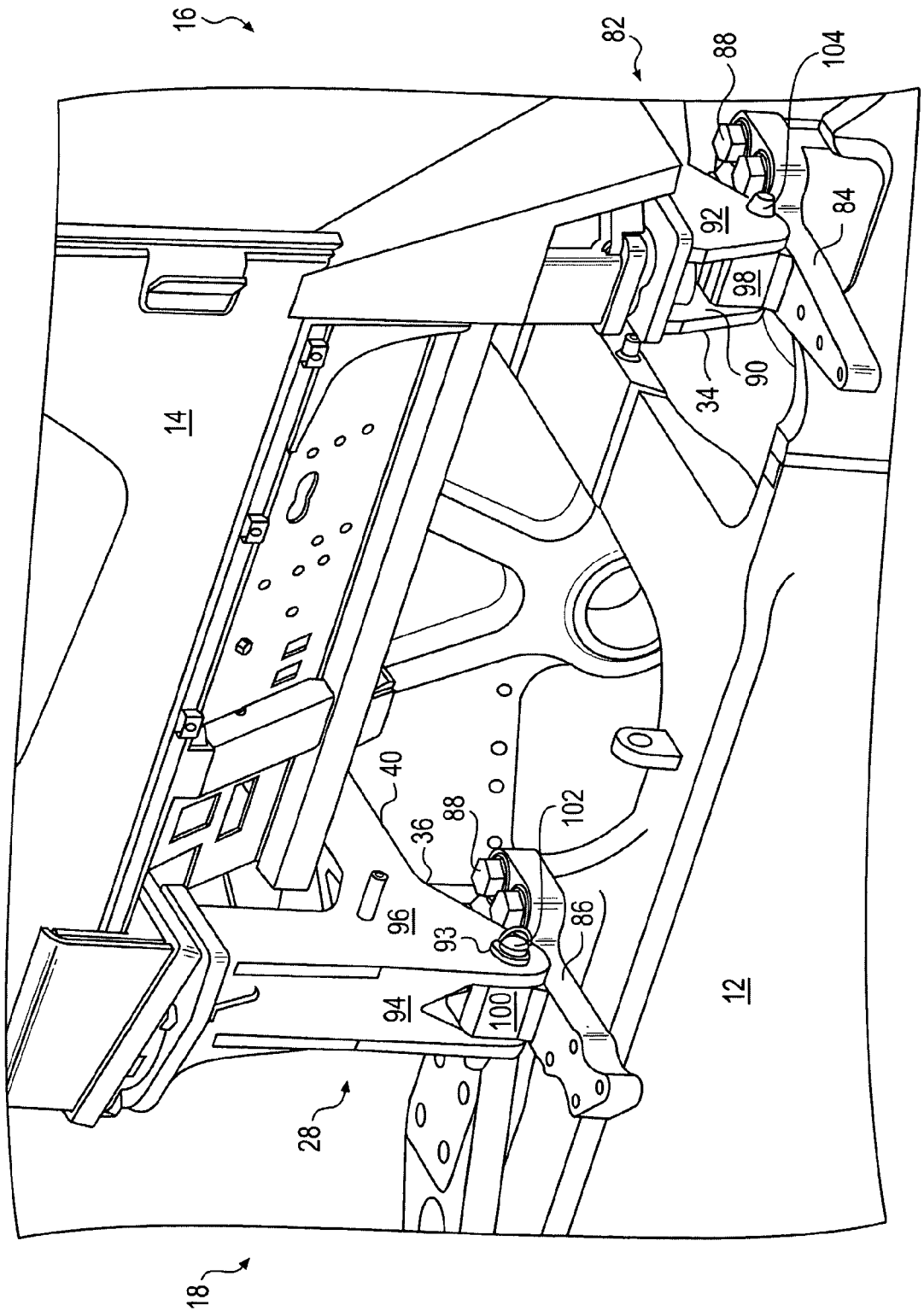
FIG. 7 is a perspective view of an embodiment of connections for a support member to a machine supporting frame on the pivot side of a tilt cab arrangement.

Support member 30, generally toward the left front of machine 10 as viewed in the embodiment of FIG. 3, may be connected to the somewhat similar support member 34, not shown in FIG. 3 but shown in FIG. 7. For example, front frame member 38 of sub-frame 11 may extend from support member 30, beneath cab 14 and across the width of cab 14 to support member 34. In the embodiment illustrated in FIG. 3, for example, front frame member 38 of sub-frame 11 may be integrally formed with support member 30 and support member 34. Support member 32, generally toward the left rear of machine 10 as viewed in the embodiment of FIG. 3, may be connected to the somewhat similar support member 36, shown in FIG. 7, by rear frame member 40, for example. The respective lengths of support members 30, 32, 34, and 36 may vary, depending on varying cab structures and dimensions. In the embodiment illustrated in FIG. 3, for example, support member 32 may be somewhat longer than support member 30. Similarly, the support members 34, 36 on the opposite side of machine 10 may be of different lengths corresponding to the differences in length between support members 30 and 32.

Figure 4:
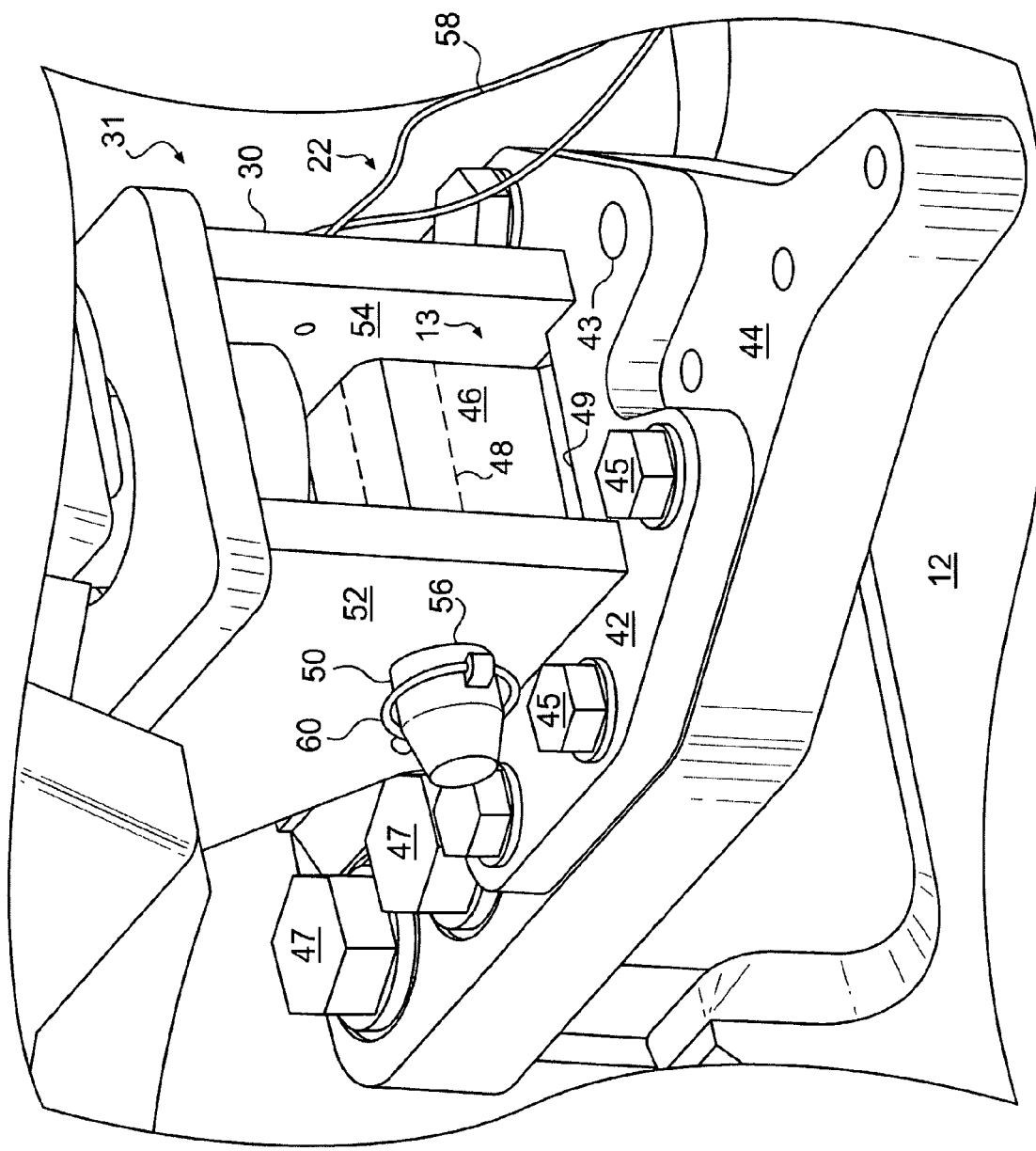
FIG. 4 is a perspective view of an embodiment of a connection of a support member to a machine supporting frame.

FIG. 4 illustrates a close-up view of an embodiment of a portion of connecting structure 22 and support member 30, viewed from an angle different from the view in FIG. 3. Flange 42 may be secured to support member 30, for example by integral casting or by welding, and may be provided with a plurality of holes 43 for receiving fasteners. Flange 42 may be configured for attachment to machine supporting frame 12. For example, flange 42 may be attached to a supporting plate 44 on machine supporting frame 12 via a plurality of bolts 45 passing through the holes 43 in flange 42 and threading into bores in the supporting plate 44. Supporting plate 44 may be integrally formed with machine supporting frame 12, for example by integral casting or by welding, or it may be a separate plate fastened to machine supporting frame 12 by bolts 47 or other fasteners.

Still referring to FIG. 4, machine supporting frame 12 may include a frame mount 13 including a protrusion 46 configured for mating engagement with support member 30. For example, protrusion 46 may be block-like in form, integral with supporting plate 44, and extending from the surface of supporting plate 44 through an opening 49 in flange 42. Protrusion 46 may include a bore 48, seen in dotted lines in FIG. 4, extending laterally through the protrusion 46. Bore 48 may be configured and sized to freely receive an elongated member, for example a pin 50, e.g., with a loose fit. For example, bore 48 may be formed of a diameter somewhat larger than the outer diameter of pin 50. Alternatively, bore 48 may be an elongated aperture, with one dimension only slightly larger than the diameter of pin 50, and a perpendicular dimension substantially larger than the diameter of pin 50. For example, bore 48 in frame mount 13 may have an elongated dimension extending along a length direction of support member 30.

The structure of support member 30 may include a cab mount 31 adjacent an end portion of the support member. Cab mount 31 may include, for example, two side members 52, 54 spaced from each other and configured to straddle protrusion 46. Each side member may include an aperture 56. When flange 42 is in connecting engagement with supporting plate 44, apertures 56 in side members 52, 54 may be aligned with bore 48 in protrusion 46. Pin 50 may be received within aligned apertures 56 and bore 48. Pin 50 may include a tether 58, loosely securing pin 50 to connecting structure 22, for example, and may include a locking member 60 configured to inhibit accidental removal of pin 50 from the aligned apertures 56 and bore 48.

Figure 5:
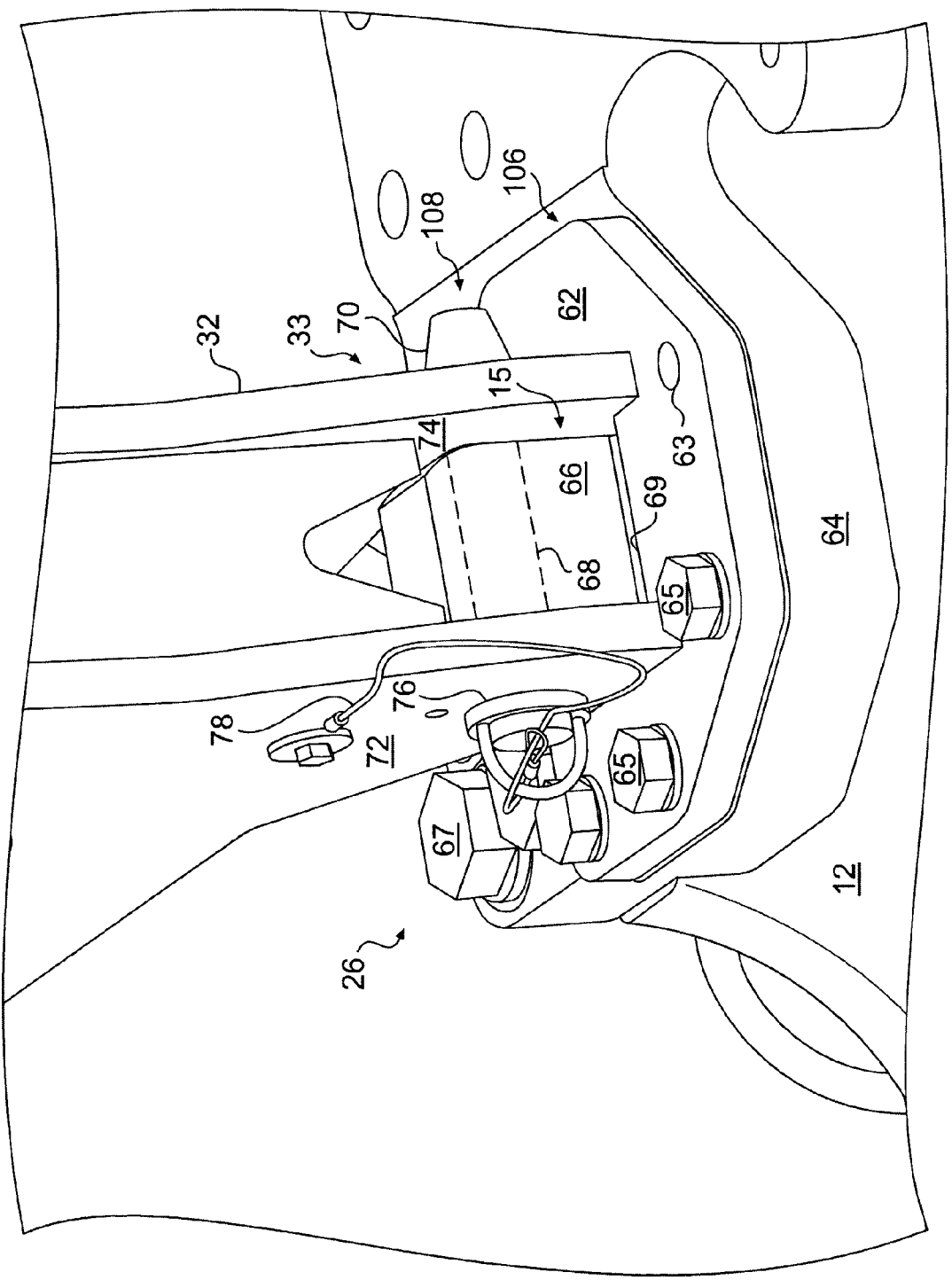
FIG. 5 is a perspective view of another embodiment of a connection of a support member to a machine supporting frame.

FIG. 5 illustrates a close-up view of an embodiment of a portion of connecting structure 26 and support member 32. Flange 62 may be secured to support member 32, for example by integral casting or by welding, and may be provided with a plurality of holes 63 for receiving fasteners. Flange 62 may be configured for attachment to machine supporting frame 12. For example, flange 62 may be attached to a supporting plate 64 on machine supporting frame 12 via a plurality of bolts 65 passing through holes 63 in flange 62 and threading into bores in the supporting plate 64. Supporting plate 64 may be integrally formed with machine supporting frame 12, for example by integral casting or by welding, or it may be a separate plate fastened to machine supporting frame 12 by bolts 67 or other fasteners.

Connecting structure 26 illustrated in FIG. 5 may have a number of features somewhat similar to those of connecting structure 22 described in connection with FIG. 4. Machine supporting frame 12 may include a frame mount 15 including a protrusion 66 extending from the surface of supporting plate 64 and configured for mating engagement with support member 32. Protrusion 66 may be integral with the surface of supporting plate 64, and may extend through an opening 69 in flange 62. Protrusion 66 may include a bore 68 extending laterally through the protrusion. Bore 68 may be configured and sized to freely receive a pin 70 with a loose fit. For example, bore 68 may be formed of a diameter somewhat larger than the outer diameter of pin 70, or bore 68 may be an elongated aperture, with one dimension only slightly larger than the diameter of pin 70, and a perpendicular dimension substantially larger than the diameter of pin 70.

Support member 32 may include a cab mount 33 adjacent an end portion of the support member. Cab mount 33 may include, for example, two side members 72, 74 configured to straddle protrusion 66. Each side member 72, 74 may include an aperture 76. When flange 62 is in engagement with supporting plate 64, apertures 76 in side members 72, 74 may be aligned with bore 68. Pin 70 may be received in aligned apertures 76 and bore 68. Pin 70 may include a tether 78, loosely securing pin 70 to connecting structure 26, for example, and may include a locking member (not shown, but similar to locking member 60) to prevent accidental removal of pin 70 from the aligned apertures 76 and bore 68.

Figure 6:
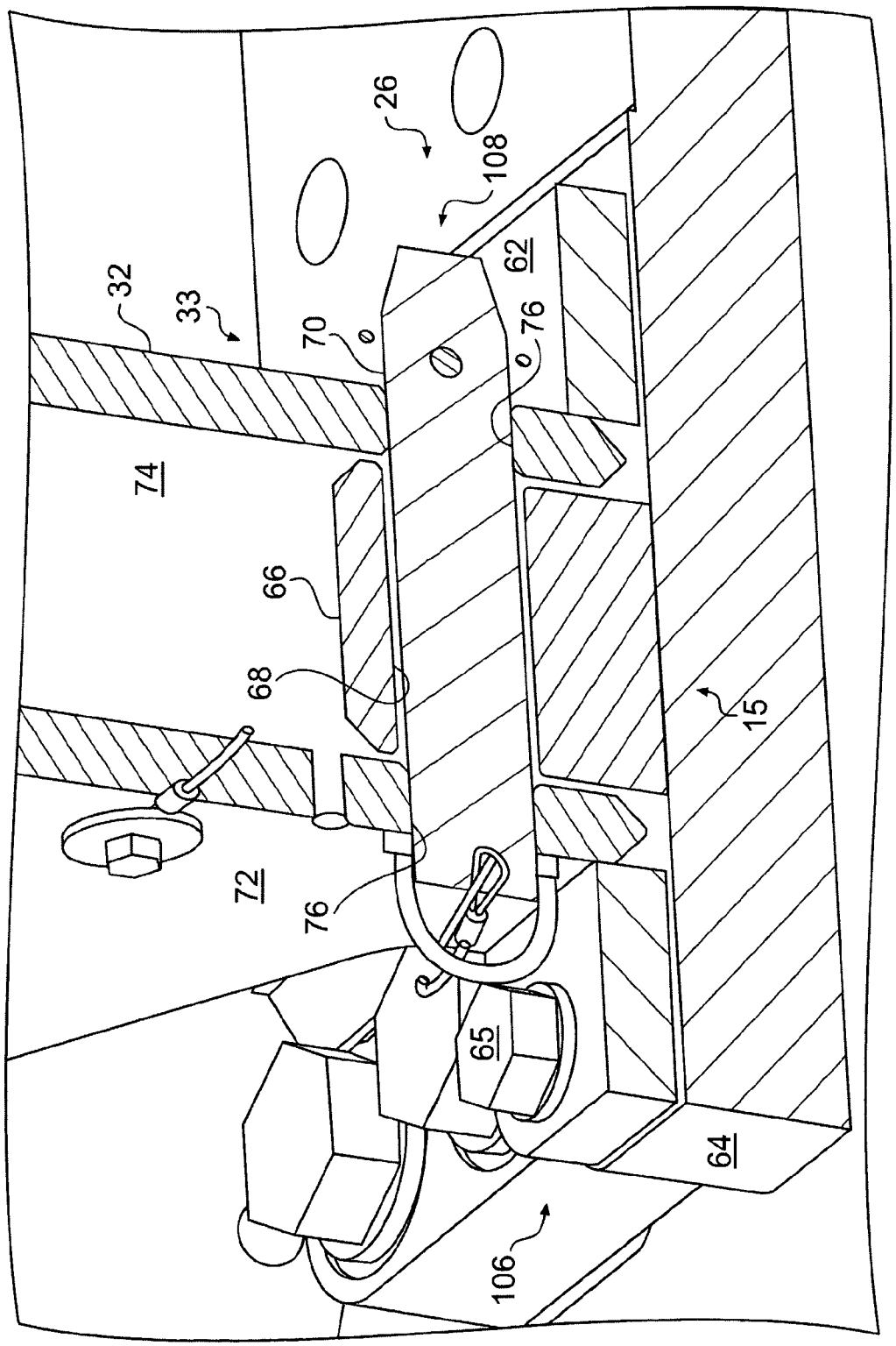
FIG. 6 is a cross-sectional view of the connection of a support member to a machine supporting frame illustrated in FIG. 5.

FIG. 6 is another view of the connecting structure 26 illustrated in FIG. 5, and showing some components in cross-section. In FIG. 6, flange 62 is shown bolted to supporting plate 64 via the plurality of bolts 65 (one of which is seen in FIG. 6). Protrusion 66 of frame mount 15 extends between the two side members 72, 74 of cab mount 33. Apertures 76 in side members 72, 74 align with bore 68 in protrusion 66. Pin 70 extends through the apertures 76 and the bore 68. As can be viewed in FIG. 6, bore 68 may have a diameter or dimension in a direction along the length of support member 32 (vertically in FIG. 6) that is larger than the diameter of apertures 76, and which forms a clearance space between pin 70 and bore 68.

FIG. 7 is a perspective view illustrating connecting structures 28 and 82 between cab 14 and machine supporting frame 12 on the side of machine 10 that is opposite to the side illustrated in FIG. 3. The view of the embodiment in FIG. 7, for purposes of convenient illustration and description, is that of the right side of a machine 10 with front 16 at the right side of FIG. 7, and rear 18 at the left side of FIG. 7. Connecting structures 28 and 82 may be configured substantially similar to their counterpart connecting structures on the opposite side of machine 10 (discussed in connection with FIG. 3), or, in the case of a tilt cab arrangement, connecting structures 28 and 82 may be configured as they are illustrated in FIG. 7 to facilitate pivoting of cab 14 relative to machine supporting frame 12.

Referring to FIG. 7, connecting structure 28 may include a number of features substantially similar to those discussed in connection with connecting structure 26 (FIG. 5), but a flange connecting support member 36 to machine supporting frame 12 may be omitted. Similarly, connecting structure 82 may include a number of features substantially similar to those discussed in connection with connecting structure 22 (FIG. 4), but a flange connecting support member 34 to machine supporting frame 12 may be omitted. Accordingly, supporting plates 84 and 86 may be suitably secured to machine supporting frame 12 via bolts 88, for example. Protrusion 98 may extend between side members 90, 92 of support member 34, and protrusion 100 may extend between side members 94, 96 of support member 36.

Apertures in side members 90, 92 may align with a bore in protrusion 98 to receive pin 104. Similarly, apertures in side members 94, 96 may align with a bore in protrusion 100 to receive pin 102. It is contemplated that supporting plates 84, 86 may be omitted, and protrusions 98, 100 may be integrally formed, welded-on, or fastener-attached projections extending directly from machine supporting frame 12. Vibration damping mechanisms 21, 25, not visible in FIG. 7 but similar to vibration damping mechanisms 20, 24 illustrated in FIGS. 1 and 2, may be included generally associated with support members 34, 36.

Figure 8:
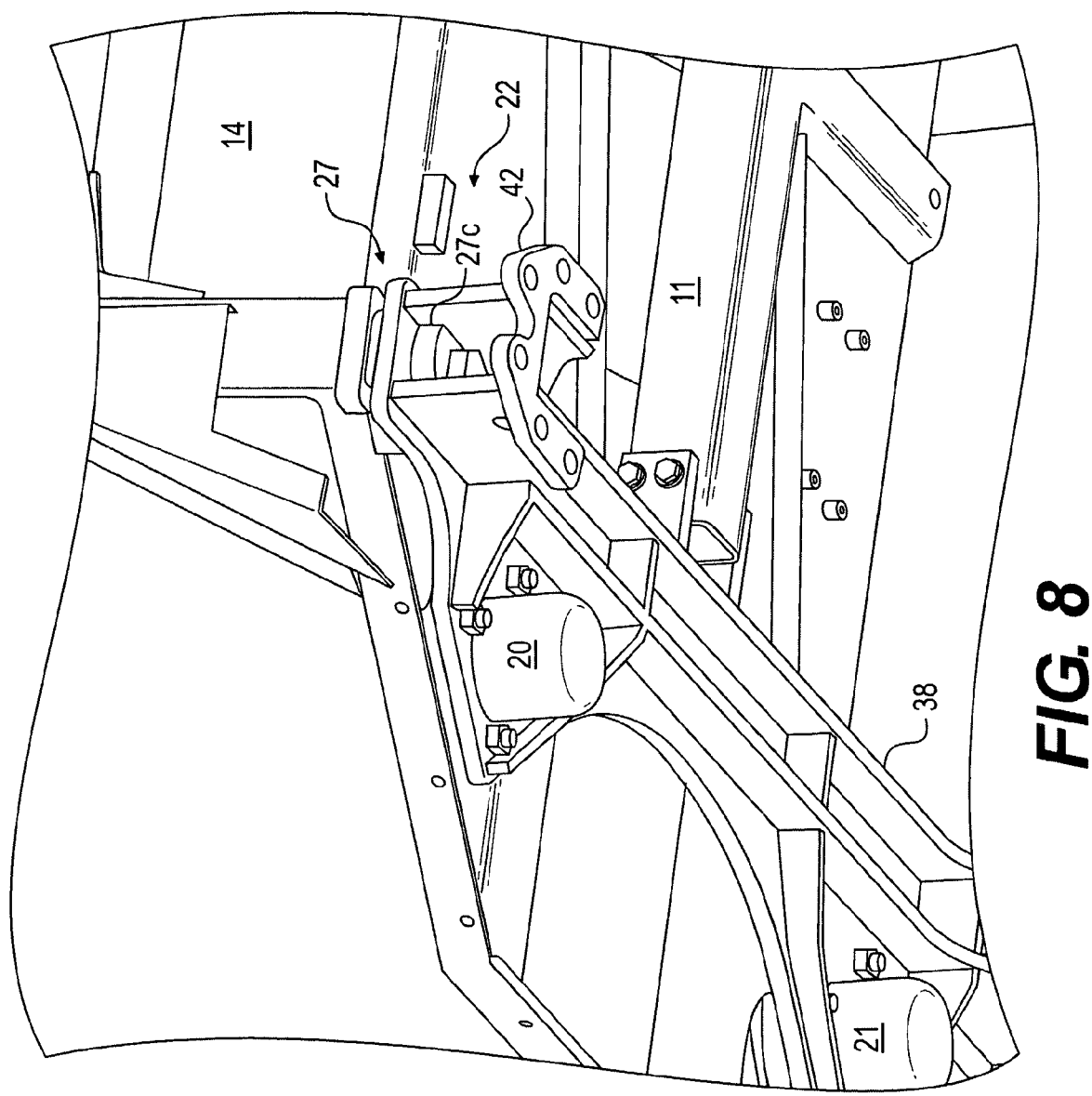
FIG. 8 is an additional perspective view from beneath a cab and a sub-frame of a machine according to disclosed embodiments.

FIG. 8 is a perspective view from beneath cab 14 and sub-frame 11 with machine supporting frame 12 removed for clarity of illustration. Both vibration damping mechanisms 20, 21, front connecting structure 22, and dead stop mechanism 27 are visible in FIG. 8. Referring to FIG. 2 and FIG. 8 together, enlarged portion 27c is seen in FIG. 8 below enlarged aperture 27b in an upper portion of front frame member 38. Stud 27a is not visible in FIG. 8, but is secured to cab 14.

Figure 9:
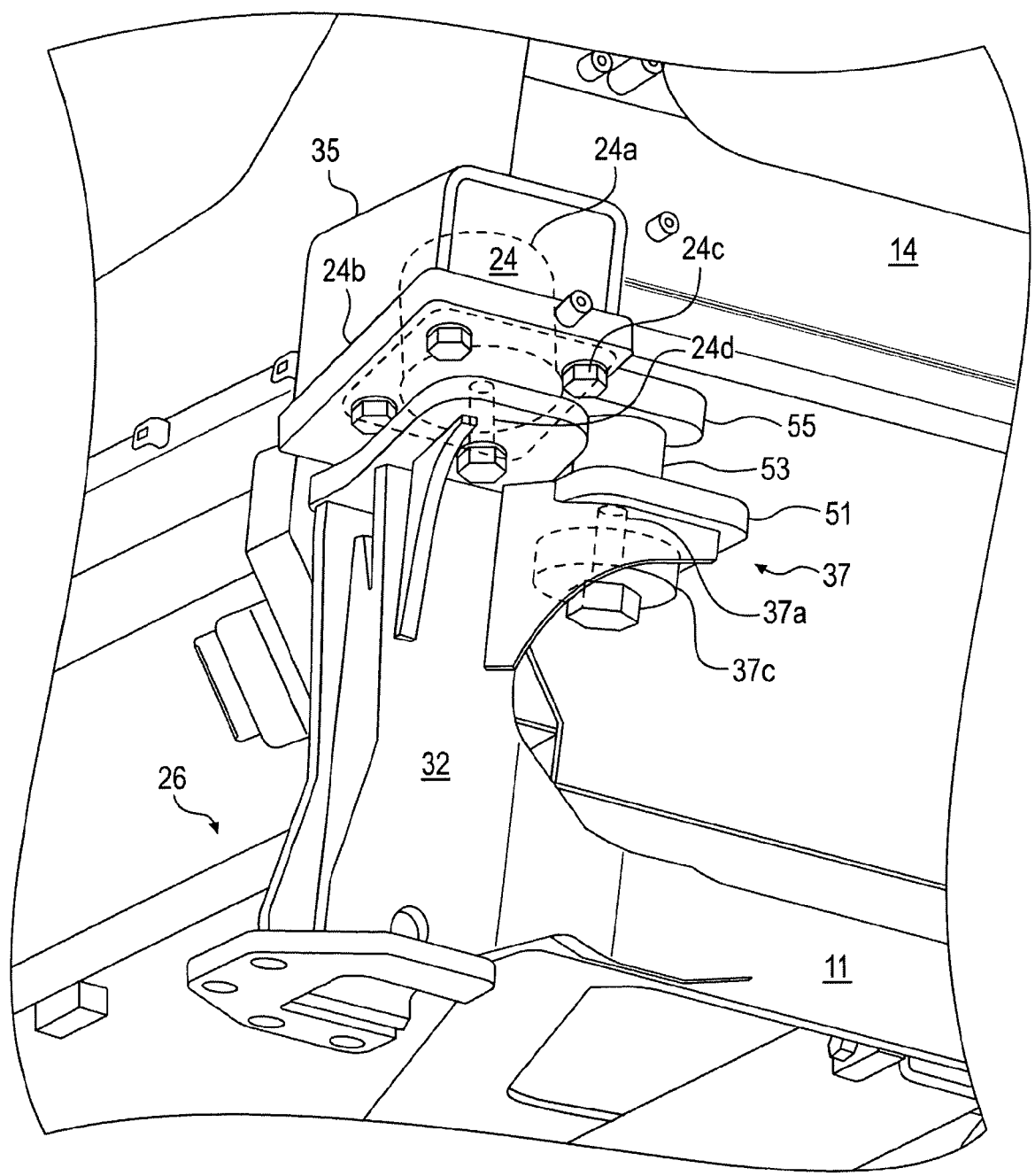
FIG. 9 is another view of a portion of a cab and a sub-frame of a machine according to disclosed embodiments.

FIG. 9 also is a perspective view from beneath cab 14 and sub-frame 11 with machine supporting frame 12 removed for clarity of illustration. FIG. 9 illustrates left rear connecting structure 26, vibration damping mechanism 24 (in dotted lines within housing structure 35), and dead stop mechanism 37. Referring to FIG. 9, plate 55 may be rigid with cab 14 while plate 51 may be rigid with connecting structure 26 of sub-frame 11. Plate 55 may include a threaded boss 53 that may receive stud 37a (e.g., a threaded bolt) of dead stop mechanism 37. As can be seen by reference back to FIG. 2, plate 51, rigid with support member 32, may include an aperture 37b that is enlarged relative to stud 37a. Referring again to FIG. 9, stud 37a may include an enlarged portion 37c that is larger than aperture 37b.

INDUSTRIAL APPLICABILITY

The disclosed structure and system may be applicable to any type of machine where it may be desirable or beneficial to provide a connecting structure between a machine cab and a machine supporting frame that facilitates connecting and disconnecting the cab from the supporting frame. In addition, the disclosed structure and system may be applicable to any type of machine where it may be desirable or beneficial to facilitate pivoting of the cab relative to the machine supporting frame where a tilt cab arrangement is employed, without breaking/disconnecting components of vibration damping mechanisms associated with the connecting structure. The disclosed structure and system also may be applicable to any type of machine where it may be desirable or beneficial to provide a connecting structure between a machine cab and a machine supporting frame that serves to reliably transfer forces between the cab and machine supporting frame in the event of machine roll-over.

Referring to the diagrammatic illustration in FIG. 1, machine 10 may perform a particular operation, such as earth moving or material handing. Machine operation may be controlled by an operator stationed in cab 14. Schematically illustrated vibration damping mechanisms 20, 24 may be situated so as to at least partially isolate from cab 14 any vibrations imparted from machine supporting frame 12, for example for operator comfort and/or to enable better operator control of the machine. Similar vibration damping mechanisms may be located on the opposite side of machine 10 from that viewed in FIG. 1. Connecting structures 22, 26 may include components to detachably but securely connect cab 14 to machine supporting frame 12, and to reliably transfer forces between cab 14 and machine supporting frame 12 in the event of a machine roll-over. Connecting structures 22, 26, as well as connecting structures 28, 82 located on the opposite side of machine 10, may be integrated into sub-frame 11 (FIG. 2).

Reference will be made to FIG. 2 to describe the general operation of vibration damping mechanisms 20, 21, 24, and 25, and dead stop mechanisms 27, 29, 37, and 39. Each vibration damping mechanism may include portions movable relative to each other to absorb or attenuate vibrations generated in machine supporting frame 12 and tending to be transmitted to cab 14. In the illustrated embodiment, the two front vibration damping mechanisms 20, 21 may include a can 20a, 21a fixed to front frame member 38 of sub-frame 11, and a stud 20d, 21d moveable relative to can 20a, 21a and fixed to cab 14 (FIG. 1). Rear vibration damping mechanisms 24, 25 may include a can 24a, 25a fixed to cab 14, and a stud (not seen in FIG. 2, but stud 24d being visible in FIG. 9) fixed to rear frame member 40 of sub-frame 11. Each of dead stop mechanisms 27, 29, 37, and 39 is shown generally associated with vibration damping mechanisms 20, 21, 24, and 25, respectively, but the relative position of vibration damping mechanisms and dead stop mechanisms may vary depending on machine parameters.

The general operation of vibration damping mechanisms 20, 21, 24, and 25 and dead stop mechanisms 27, 29, 37, and 39 will be described by referring to FIG. 2 and, for example, to vibration damping mechanism 20 and dead stop mechanism 27. Because can 20a of vibration damping mechanism 20 is fixed relative to sub-frame 11 which is in turn fixed to machine supporting frame 12, can 20a is directly subject to movements, vibrations, and shocks of machine supporting frame 12. On the other hand, stud 20d of vibration damping mechanism 20 is fixed relative to cab 14 and moves with cab 14. However, can 20a and stud 20d may move relative to each other via, for example, a visco-elastic connection within vibration damping mechanism 20. Accordingly, vibration damping mechanism 20 has a damping effect on movements, vibrations, and shocks to which machine supporting frame 12 is subjected, tending to inhibit their transmission into cab 14.

Dead stop mechanism 27 may serve to limit relative movement within vibration damping mechanism 20. When machine 10 incurs forces tending to cause more than a predetermined movement of cab 14 relative to machine supporting frame 12 and sub-frame 11 (for example, during a machine roll-over event), dead stop mechanism 27 may prevent damage to vibration damping mechanism 20 and may serve to prevent separation of cab 14 from sub-frame 11 and machine supporting frame 12. As cab 14 may tend to separate from sub-frame 11, enlarged portion 27c on stud 27a (which is rigidly secured to cab 14) may abut against front frame member 38 since enlarged portion 27c is larger than, and thus cannot pass through, aperture 27b. Accordingly, dead stop mechanism 27 may act as a limit to movement within vibration damping mechanism 20 and may tend to prevent separation of cab 14 from sub-frame 11 and concomitant damage to vibration damping mechanism 20.

In the embodiment illustrated in FIG. 2, the mounting and functioning of vibration damping mechanism 21 is substantially similar to that of vibration damping mechanism 20. Also in the embodiment illustrated in FIG. 2, rear vibration damping mechanisms 24, 25 operate in a manner similar to vibration damping mechanisms 20, 21, except that cans 24a, 25a are fixed relative to cab 14 instead of being fixed to sub-frame 11, and movable studs of vibration damping mechanisms 24, 25 (not seen in FIG. 2) are fixed relative to sub-frame 11. Rear dead stop mechanisms 37, 39 operate generally in a manner similar to front dead stop mechanisms 27, 29. FIG. 8 illustrates a somewhat closer view of dead stop mechanism 27 from beneath, and FIG. 9 illustrates a somewhat closer view of dead stop mechanism 37 from beneath.

Aspects of the structure and operation of one embodiment of connecting structure that may be suitable for attachment of cab 14 to machine supporting frame 12 will be discussed with reference to FIGS. 5 and 6, showing in more detail the connecting structure 26 that is schematically illustrated in FIG. 1. Flange 62 may be attached to a supporting plate 64 on machine supporting frame 12 via a plurality of bolts 65 passing through holes 63 in flange 62 and threading into bores in the supporting plate 64. Pin 70 may be inserted through apertures 76 in side members 72, 74 and bore 68 in the protrusion 66 secured to supporting plate 64. Referring briefly to FIG. 4, illustrating in more detail the connecting structure 22 shown in FIG. 3, portions of connecting structure 22 are similar to portions of connecting structure 26, and the operation is similar.

Referring to FIGS. 3 and 7, each of connecting structure 22, 26 (FIG. 3), and 28, 82 (FIG. 7), may include components to detachably but securely connect support members 30, 32 (FIG. 3), and 34, 36 (FIG. 7) to machine supporting frame 12. As an example, referring to FIG. 4 for details of connecting structure 22, support member 30 may be detached from machine supporting frame 12 by removal of the plurality of bolts 45 and removal of pin 50 from apertures 56 and bore 48. Similarly, referring to FIG. 5 for details of connecting structure 26, support member 32 may be detached from machine supporting frame 12 by removal of the plurality of bolts 65 and removal of pin 70 from apertures 76 and bore 68. While it is contemplated that connecting structures 28, 82 on the opposite side of machine 10 could be configured in a similar fashion and disconnected in a similar fashion, and cab 14 then could readily be removed from machine supporting frame 12, FIG. 7 illustrates an embodiment for connecting structure 28, 82 configured for a tilt cab arrangement.

As can be seen in FIG. 7, for a tilt cab arrangement support member 34 and support member 36 may not include mounting flanges. Instead, connection of support members 34, 36 to machine supporting frame 12 may be accomplished via pins 102 and 104 without a bolted-on flange connection. Protrusions 98, 100 may protrude from machine supporting frame 12, or they may protrude from supporting plates 84, 86, secured to machine supporting frame 12 by bolts 88, or by welding, for example. Pin 102 may extend through apertures in side members 94, 96 of support member 36 and through a bore in protrusion 100. Similarly, pin 104 may extend through apertures in side members 90, 92 of support member 34 and through a bore in protrusion 98. Upon detaching support members 30, 32 (FIG. 3) from machine supporting frame 12, cab 14 may be tilted by pivoting cab 14 about the longitudinal axes of pins 102, 104 (FIG. 7). By virtue of cab 14 being configured to pivot about pins 102, 104, it may be convenient to inspect and/or service components located underneath or in the vicinity of cab 14.

Pins 50, 70 associated with connecting structures 22, 26 may help serve to transmit roll-over forces and maintain a rigid connection between cab 14 and machine supporting frame 12, and enable flanges 42, 62 to be bolted to machine supporting frame 12 with substantially smaller bolts than would otherwise be needed to withstand roll-over stresses in the absence of the roll-over protection offered by pins 50, 70 (FIGS. 4 and 5). When a tilt cab arrangement is employed, connecting structures may be readily disconnected to enable pivoting of the cab about pin connections at other connecting structures. For example, pins 50, 70 may readily be removed without special pin removing equipment since they normally are received in apertures in side members 52, 54 and 72, 74, and in respective bores 48, 68 of protrusions 46, 66 in a non-binding manner. In other words, absent some degree of machine deformation due to, for example, machine roll-over, pins 50 and 70 will be readily removable since load stresses between cab 14 and machine supporting frame 12 will normally be carried by flanges 42, 62 from which bolts 45, 65 may readily be removed. The convenience of smaller sized bolts 45, 65, due to the provision of the pin connections (pins 50, 70) may serve to facilitate bolt removal. Once disconnecting of cab 14 and machine supporting frame 12 has been achieved at those connecting structures not designated as pivots for a tilt cab arrangement, cab 14 may then readily be tilted to enable inspection and/or maintenance of components otherwise not readily accessible with cab 14 in its normally connected mode.

When it may become desirable to disconnect some or all of the connecting structures 22, 26, 28, 82, either to enable removal of cab 14 from machine supporting frame 12, or to enable pivoting of cab 14 relative to machine supporting frame 12 where a tilt cab arrangement is employed, the bolted flange connection and separate pin connection facilitates disconnecting the connecting structures. Because, the vibration damping mechanisms are located substantially spaced from the connecting structures, for example between the support members 30, 32, 34, 36 and the cab 14, the vibration damping mechanisms are left structurally unaffected by the disconnection. In other words, cab 14 may be tilted relative to machine supporting frame 12 without breaking the vibration damping mechanisms or their connections to the cab and/or support members.

At this point it is to be noted that, while embodiments with four connecting structures are illustrated, it is contemplated that cab 14 may be connected to machine supporting frame 12 by any suitable number of connecting structures (e.g., three, five, six, etc.). In addition, it is contemplated that all connecting structures could be identical (e.g., similar to connecting structure 26 shown in FIG. 5, or similar to connecting structure 22 shown in FIG. 4), or the connecting structure could vary somewhat in detail as illustrated connecting structure 22 varies from illustrated connecting structure 26. Further, where it may be desirable to employ a tilt cab arrangement, connecting structures on one side of machine 10 may be configured to enable pivoting of cab 14 relative to machine supporting frame 12 when connecting structures on the opposite side of machine 10 are disconnected. For example, FIG. 7 illustrates an embodiment wherein connecting structures 28, 82 are configured to facilitate pivoting of cab 14 when connecting structures 22, 26 on the opposite side of machine 10 (FIG. 3) are disconnected.

It will be apparent to those skilled in the art that various modifications and variations can be made to the embodiments disclosed. Other embodiments will be apparent to those skilled in the art from consideration of the specification and practice of the disclosed embodiments. It is intended that the specification and examples be considered as examples only, with a true scope being indicated by the following claims.

What is claimed is:

1. A system for connecting a cab to a machine supporting frame, comprising:
   a single sub-frame secured to the machine supporting frame and configured to tilt relative to the machine supporting frame;
   a plurality of vibration damping mechanisms fastened to the sub-frame and configured to at least partially inhibit transmission of shocks and vibrations between the sub-frame and the cab;
   a plurality of dead stop mechanisms configured to permit a limited range of movement between the sub-frame and the cab;
   a rigid connection between the machine supporting frame and the sub-frame configured to be selectively disconnected; and
   a pivot connection between the machine supporting frame and the sub-frame configured to permit the sub-frame and the cab to be tilted relative to the machine supporting frame upon disconnection of the rigid connection.

2. The system of claim 1, wherein the rigid connection includes a flange secured to the sub-frame and attached to the machine supporting frame.

3. The system of claim 2, wherein the flange includes a plurality of holes, and wherein a plurality of fasteners extend through the holes into the machine supporting frame.

4. The system of claim 3, wherein the flange is integral with a support member on the sub-frame, and the plurality of fasteners are bolts threaded into a supporting plate on the machine supporting frame.

5. The system of claim 1, wherein the rigid connection further includes a plurality of support members on the sub-frame, and a plurality of frame mounts on the machine supporting frame.

6. The system of claim 5, wherein each support member includes a cab mount including at least one aperture, and each frame mount includes a bore configured to be aligned with the aperture.

7. The system of claim 6, wherein each cab mount includes a plurality of aligned apertures, and further including a pin extending through the aligned apertures and the bore.

8. The system of claim 6, wherein each frame mount includes a protrusion extending from the surface of the machine supporting frame, and wherein the bore in the frame mount extends through the protrusion.

9. The system of claim 8, wherein each cab mount includes two side members, and each side member includes an aperture configured to be aligned with the bore in the protrusion.

10. The system of claim 1, wherein each dead stop mechanism includes a stud rigidly mounted to the cab and extending through an aperture in the sub-frame, wherein the diameter of the aperture is substantially larger than the diameter of the stud.

11. The system of claim 10, wherein the stud is mounted to the cab on one side of the aperture, and the stud includes an enlarged portion on the other side of the aperture that is larger in diameter than the diameter of the aperture.

12. A system for connecting a cab to a machine supporting frame, comprising:
    a sub-frame;
    vibration damping mechanisms coupling the sub-frame to the cab;
    a dead stop mechanism permitting a limited range of movement between the sub-frame and the cab;
    a flange on the sub-frame;
    at least one fastener securing the flange to the machine supporting frame;
    a pair of apertures extending through the sub-frame;
    a frame mount including a protrusion attached to the machine supporting frame and a bore aligned with the pair of apertures; and
    a pin extending through the aligned apertures and bore, wherein
    the flange includes an opening configured to receive the protrusion, and the protrusion extends into the opening in the flange.

13. The system of claim 12, wherein the at least one fastener includes a plurality of bolts extending through holes in the flange and securing the flange to the machine supporting frame.

14. The system of claim 12, wherein the flange is welded to the sub-frame.

15. The system of claim 12, wherein the pin includes a locking member configured to inhibit accidental removal of the pin from the aligned apertures and bore.

16. The system of claim 12, wherein the dead stop mechanism includes a first member coupled to the sub-frame and a second member coupled to the cab; and the first and second members are configured to move relative to each other to accommodate movement of the cab relative to the sub-frame.

17. The system of claim 16, wherein the vibration damping mechanism is configured to constrain movement of the first member relative to the second member.

18. A machine, comprising:
    a cab;
    a supporting frame;
    a single sub-frame mounted on the supporting frame and configured to tilt relative to the supporting frame;
    a plurality of vibration damping mechanisms connecting the sub-frame to the cab;
    a plurality of dead stop mechanisms configured to limit movement between the sub-frame and the cab;
    a plurality of support members on the sub-frame;
    a plurality of frame mounts on the supporting frame, each frame mount configured to cooperate with one of the support members;
    a flange mounted adjacent an end of one of the plurality of support members;
    a plurality of fasteners extending through the flange and secured to the supporting frame;

a bore in each of the frame mounts aligned with apertures in each cooperating support member; and a removable pin extending through the aligned bore and apertures.

19. The machine of claim 18, including pivot connections adjacent an end of at least some of the plurality of support members and configured to enable tilting of the sub-frame relative to the supporting frame.

* * * * *

UNITED STATES PATENT AND TRADEMARK OFFICE
CERTIFICATE OF CORRECTION

| | |
|---|---|
| PATENT NO. | : 8,182,024 B2 |
| APPLICATION NO. | : 12/314125 |
| DATED | : May 22, 2012 |
| INVENTOR(S) | : Hayes et al. |

Page 1 of 1

It is certified that error appears in the above-identified patent and that said Letters Patent is hereby corrected as shown below:

In the Specification

Column 1, lines 6-7, delete "filed May 31, 2006, now abandoned the entire contents" and insert -- filed May 31, 2006, now abandoned, the entire contents --.

Signed and Sealed this
Eleventh Day of August, 2015

Michelle K. Lee
*Director of the United States Patent and Trademark Office*